(12) United States Patent
Shigeta

(10) Patent No.: US 6,552,751 B1
(45) Date of Patent: Apr. 22, 2003

(54) VIDEO SIGNAL PROCESSING CIRCUIT AND COLOR ADJUSTING CIRCUIT FOR COLOR VIDEO SIGNAL

(75) Inventor: Tetsuya Shigeta, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/557,616

(22) Filed: Apr. 25, 2000

(30) Foreign Application Priority Data

Apr. 28, 1999 (JP) ............................................ 11-122531
May 19, 1999 (JP) ............................................ 11-138060

(51) Int. Cl.⁷ ............................. H04N 9/67; H04N 9/64
(52) U.S. Cl. ...................... 348/659; 348/661; 348/649; 348/655; 348/679; 348/687
(58) Field of Search .................... 348/659, 661, 348/649, 645, 655, 687, 678, 679; 345/604; 358/518, 520, 516; 382/162, 167; H04N 9/67, 9/64, 9/68, 9/73, 5/52, 5/57

(56) References Cited

U.S. PATENT DOCUMENTS 4,679,072 A * 7/1987 Takayama ................... 348/645
4,788,586 A * 11/1988 Eckenbrecht ............... 348/645

* cited by examiner

*Primary Examiner*—Sherrie Hsia
(74) *Attorney, Agent, or Firm*—Morgan, Lewis & Bockius LLP

(57) ABSTRACT

A video signal processing circuit for making adjustments of a brightness, a contrast, a hue, and the like of a color video signal by a simple circuit construction. Input video signals which are supplied as 3-primary color signals or luminance and color difference signals are converted to the luminance and color difference signals or the 3-primary color signals and processed to effect adjustments of a picture displaying form, and the adjusted signals are inversely converted subsequently.

5 Claims, 10 Drawing Sheets

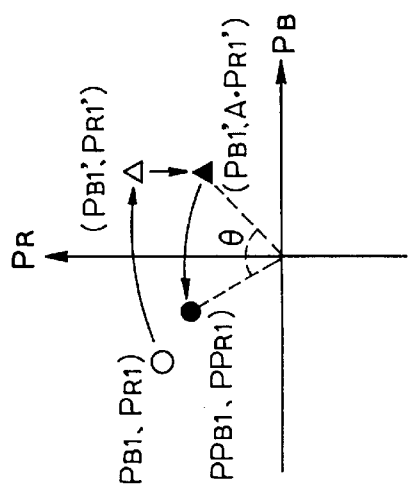
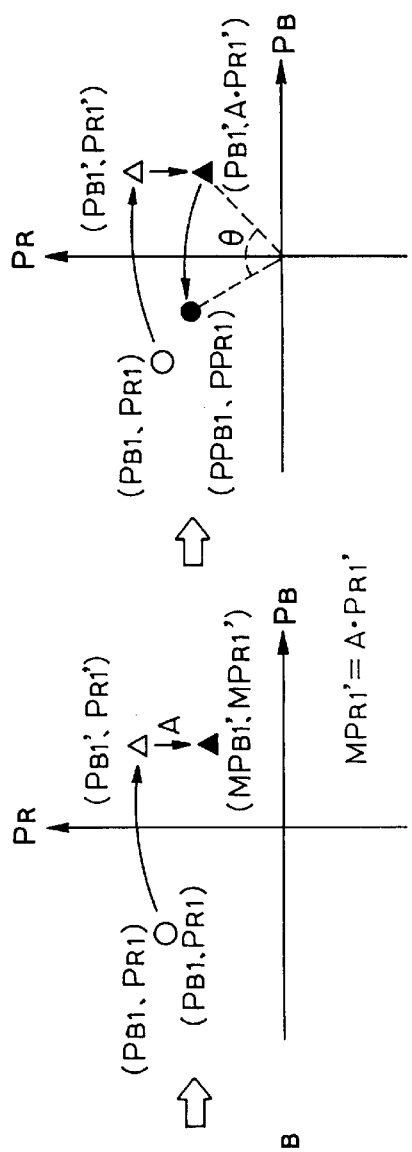
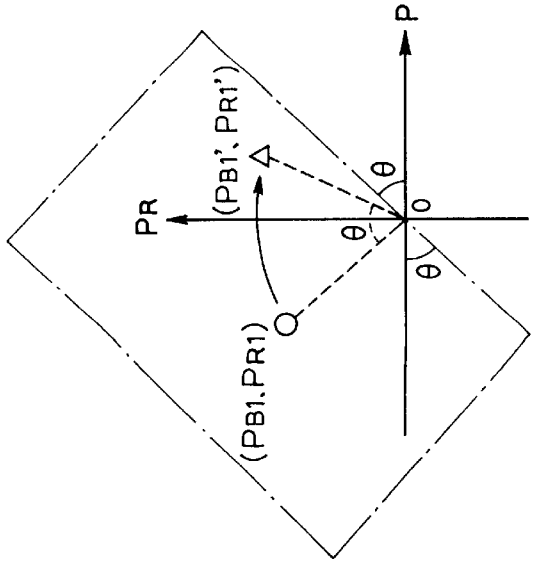

ately with a desired color state.

VIDEO SIGNAL PROCESSING CIRCUIT AND COLOR ADJUSTING CIRCUIT FOR COLOR VIDEO SIGNAL

BACKGROUND OF THE INVENTION

1. Field of the Invention

The invention relates to a video signal processing circuit for performing a signal processing that is useful, for example, to allow a display panel such as a plasma display panel or the like, or a display such as a CRT or the like to display a video image of desired brightness, contrast, color tone, white balance, and so on.

The invention also relates to a color adjusting circuit for performing a color adjusting process to a color video signal, particularly, to color difference signals.

2. Description of Related Art

Japanese Patent Kokai 2-296290 discloses a color adjusting apparatus in which 3-primary color component data is converted to luminance component data and chromaticity component data, the obtained chromaticity component data is further transformed to polar coordinates, a color tone is adjusted by adjusting the level of the polar coordinates component data, and thereafter, the data after the adjustment is inversely converted, thereby returning it to the original 3-primary color component data.

Since the color adjusting apparatus involves the polar coordinates transformation which needs complicated arithmetic operations, a problem is that a circuit construction of the whole apparatus is complicated and the apparatus becomes expensive.

On the other hand, a color display is generally provided with a color adjusting circuit for performing color adjustments of saturation, hue, and the like in order to obtain a desired color display state.

According to conventional color adjusting circuits, however, since the adjusting process is performed to all of the colors in a display image, the color adjustments are performed also to a color component to which the user wants to maintain a present color state. Consequently, a problem exists that it is difficult to adjust the color display to a desired color display state.

OBJECTS AND SUMMARY OF THE INVENTION

The invention has been made to solve the problems and it is an object of the invention to provide a video signal processing circuit which can perform conversion between 3-primary color signals and a luminance signal and color difference signals and also can perform various adjustments to a video signal by a simple circuit construction.

It is another object of the invention to provide a color adjusting circuit of a color video signal which can perform color adjustments such as saturation adjustment and hue adjustment only to a desired color region in a display image.

According to the invention, there is provided a color adjusting circuit of a color video signal for obtaining color adjustment color difference signals by performing a color adjusting process according to a color adjustment signal to color difference signals in the color video signal, comprising: a first coordinates transforming circuit for performing a rotary coordinate transformation to the color difference signals by an amount corresponding to a color designation angle according to a color designation signal, thereby obtaining rotated color difference signals; a region discriminating circuit for discriminating whether the color difference signals exist in the color region shown by the color designation signal in color coordinates or not; a level adjusting circuit for performing a level adjustment according to the color adjustment signal only to the rotated color difference signals obtained based on the color difference signals which were determined to be existing in the color region; and a second coordinates transforming circuit for performing a rotary coordinate transformation to the rotated color difference signals subjected to the level adjustment by the level adjusting circuit by the amount corresponding to the color designation angle in the direction opposite to that in the rotary coordinate transformation and outputting resultant signals as the color adjustment color difference signals.

BRIEF EXPLANATION OF THE DRAWINGS

FIGS. 3A to 3C are diagrams for explaining the internal operation in the saturation adjusting circuit shown in FIG. 2;

DETAILED DESCRIPTION OF THE PREFERRED EMBODIMENT

Figure 1:
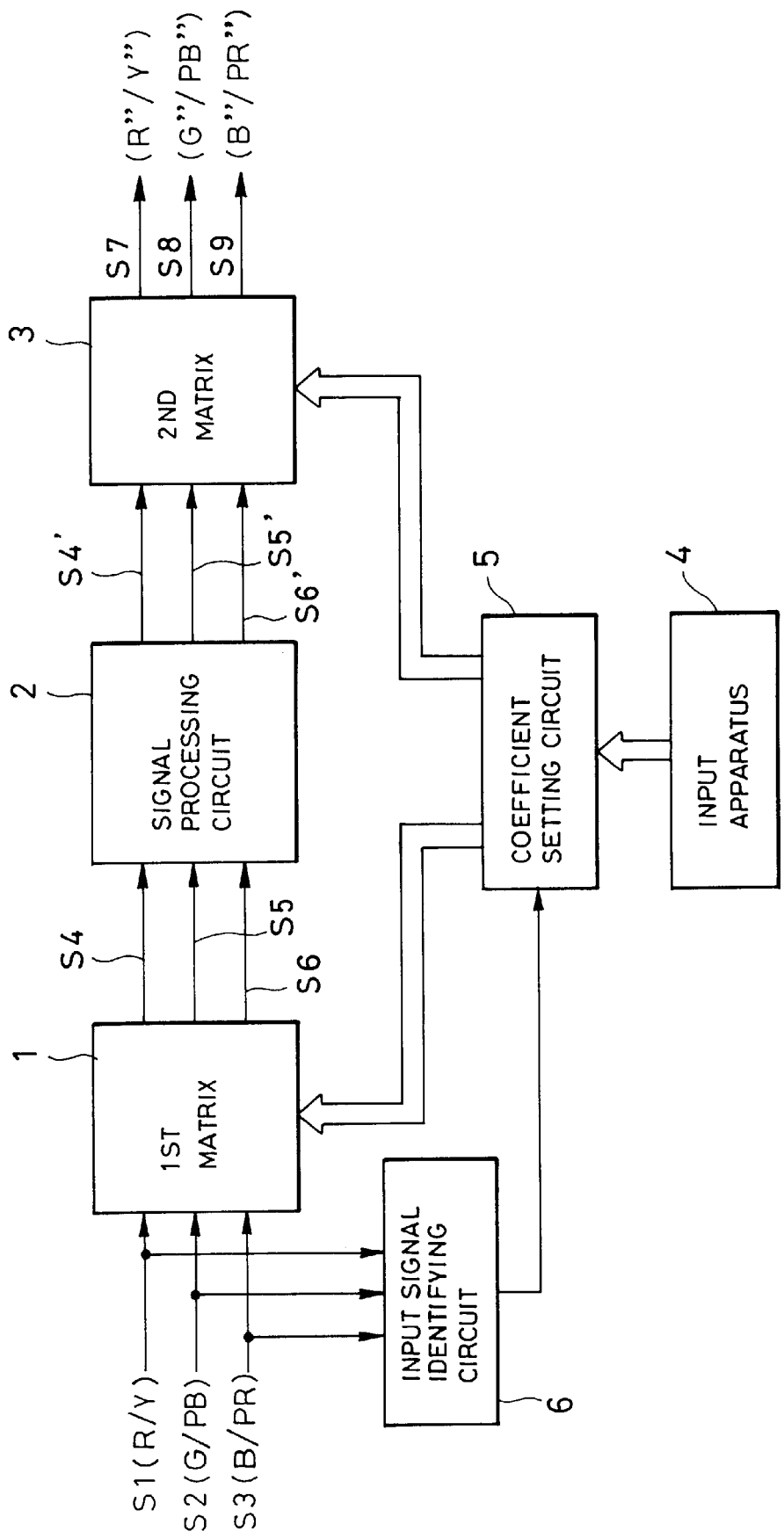
FIG. 1 is a circuit diagram showing the first embodiment of the invention.

FIG. 1 shows a video signal processing circuit according to an embodiment of the invention.

In FIG. 1, a first matrix circuit 1 receives three kinds of input signals S1, S2, and S3 which are supplied from a video signal source (not shown) such as a VTR or the like, for example, 3-primary color data R, G, and B or luminance component data Y and two color difference component data PR and $P_B$, performs a first matrix arithmetic operation to the received data, and generates three kinds of signals S4, S5, and S6, for example, three kinds of signals S4, S5, and S6 comprising the luminance component data Y and two color difference component data $P_R$ and $P_B$, respectively.

The three kinds of signals S4, S5, and S6 (for example, the luminance component data Y and two color difference component data $P_R$ and $P_B$) obtained by the first matrix circuit 1 are supplied to a signal processing circuit 2. The signal processing circuit 2 performs a scanning line converting process or picture quality adjusting processes such as outline correction, black level expansion, white level expansion, dynamic range correction, noise reduction, aspect ratio conversion, resolution conversion, and the like to the three kinds of signals S4, S5, and S6 (for example, the luminance component data Y and two color difference component data $P_R$ and $P_B$), thereby adjusting a picture display form. Three kinds of signals S4', S5', and S6' (for example, luminance component data Y' and two color difference component data $P_R$' and $P_B$') subjected to those signal processes are subsequently subjected to a second matrix arithmetic operation by a second matrix circuit 3 and converted to three kinds of signals S7, S8, and S9, for example, 3-primary color data R", G", and B" or luminance component data Y" and two color difference component data $P_R$" and $P_B$" and generated.

Arithmetic operational equations of the first matrix arithmetic operation are as follows.

$$S4 = A1 \cdot S1 + A2 \cdot S2 + A3 \cdot S3 + \alpha 1$$

$$S5 = A4 \cdot S1 + A5 \cdot S2 + A6 \cdot S3 + \alpha 2$$

$$S6 = A7 \cdot S1 + A8 \cdot S2 + A9 \cdot S3 + \alpha 3 \quad (1)$$

Arithmetic operational equations of the second matrix arithmetic operation are as follows.

$$S7 = C1 \cdot S4 + C2 \cdot S5 + C3 \cdot S6 + \beta 1$$

$$S8 = C4 \cdot S4 + C5 \cdot S5 + C6 \cdot S6 + \beta 2$$

$$S9 = C7 \cdot S4 + C8 \cdot S5 + C9 \cdot S6 + \beta 3 \quad (2)$$

The video signal processing circuit shown in FIG. 1 further includes: an input apparatus 4 comprising, for example, a keyboard or the like; a coefficient setting circuit 5 comprising a microprocessor or the like; and an input signal identifying circuit 6. The input signal identifying circuit 6 identifies whether the input signals are the 3-primary color data R, G, and B or the luminance component data Y and two color difference component data $P_R$ and $P_B$. In response to input signal identification information from the input signal identifying circuit 6 and an operation input by the input apparatus, the coefficient setting circuit 5 sets values of the first matrix coefficient group A1 to A9 and $\alpha 1$ to $\alpha 3$ of the first matrix circuit 1 and values of the second matrix coefficient group C1 to C9 and $\beta 1$ to $\beta 3$ of the second matrix circuit 3, respectively.

In the video signal processing circuit of the embodiment, since the first and second matrix coefficient groups can be freely adjusted, the conversion between the 3-primary color signals R, G, and B and the luminance signal Y and color difference signals $P_R$ and $P_B$ and various adjustments to the video signal, for example, the adjustments such as contrast, brightness, color, hue, white balance, and the like can be simultaneously performed in the first or second matrix circuit, respectively.

In the video signal processing circuit of the embodiment, since the first and second matrix coefficient groups can be freely adjusted, for example, if the processes are performed in the form of the luminance signal Y and color difference signals $P_R$ and $P_B$ by the signal processing circuit 2, even when the input signals are in the form of the 3-primary color signals R, G, and B or in the form of the luminance signal Y and color difference signals $P_R$ and $P_B$, it is possible to cope with it merely by changing the setting of the first matrix coefficient group in the first matrix circuit. A form of output signals can be also set to the form of the 3-primary color signals R, G, and B or the form of the luminance signal Y and color difference signals $P_R$ and $P_B$ merely by changing the setting of the second matrix coefficient group in the second matrix circuit 3.

Specific examples will now be described in detail hereinbelow.

In the case where the input signals are the 3-primary color signals R, G, and B of the NTSC system, they are converted to the luminance signal Y and color difference signals $P_R$ and $P_B$ by the first matrix circuit 1 and processed by the signal processing circuit 2 and, thereafter, they are inversely converted to the 3-primary color signals R, G, and B by the second matrix circuit and outputted, when it is assumed that S1, S2, and S3 are set to R, G, and B and S4, S5, and S6 are set to Y, $P_R$, and $P_B$ in the equations (1), the first matrix coefficients are as follows.

$(A1, A2, A3, \alpha 1) = (0.299, 0.587, 0.114, 0)$ $(A4, A5, A6, \alpha 2) = (-0.169, -0.331, 0.500, 0)$ $(A7, A8, A9, \alpha 3) = (0.500, -0.419, -0.081, 0)$ When it is assumed that S4, S5, and S6 are set to Y, $P_R$, and $P_B$ and S7, S8, and S9 are set to R, G, and B in the equations (2), the second matrix coefficients in the equations (2) are as follows.

$(C1, C2, C3, \beta 1) = (1.0, 0, 1.402, 0)$ $(C4, C5, C6, \beta 2) = (1.0, -0.344, -0.714, 0)$ $(C7, C8, C9, \beta 3) = (1.0, 1.772, 0, 0)$ In case of adjusting the contrast in the second matrix circuit 3, the adjustment of the contrast is executed by adjusting the values of the coefficients C1, C4, and C7 to be multiplied to the luminance signal Y in the second matrix coefficient group.

For example, when increasing the contrast 1.5 times, the values of the coefficients C1, C4, and C7 in the second matrix coefficient group in the equations (2) are increased 1.5 times and the values in the second matrix coefficient group are set as follows.

$(C1, C2, C3, \beta 1) = (1.5, 0, 1.402, 0)$ $(C4, C5, C6, \beta 2) = (1.5, -0.344, -0.714, 0)$ $(C7, C8, C9, \beta 3) = (1.5, 1.772, 0, 0)$ In place of adjusting the second matrix coefficient, the contrast of the input video signal can be adjusted by adjusting the values of the coefficients A1 to A9 in the first matrix coefficient group.

The brightness of an image can be adjusted by adjusting the values of the coefficients $\alpha 1$ to $\alpha 3$ in the first matrix coefficient group or the values of the coefficients $\beta 1$ to $\beta 3$ in the second matrix coefficient group.

The color or hue can be adjusted by adjusting the values of the coefficients A4 to A9 (in the first matrix coefficient group) to be multiplied to the color components of the 3-primary color signals R, G, and B.

For example, when increasing a gain of a color 0.5 time in the first matrix circuit 1, the values of the coefficients A4 to A9 in the first matrix coefficient group in the equations (1) are increased 0.5 time and the values of the first matrix coefficient group are set as follows.

$(A1, A2, A3, \alpha 1) = (0.299, 0.587, 0.114, 0)$ $(A4, A5, A6, \alpha 2) = (-0.085, -0.166, 0.250, 0)$ $(A7, A8, A9, \alpha 3) = (0.250, -0.210, -0.041, 0)$ In case of adjusting the hue in the first matrix circuit 1, the values of the first matrix coefficient group in the equations (1) are set as follows.

$A1=0.299, A2=0.587, A3=0.114$ $A4=\cos\theta\cdot(-0.169)-\sin\theta\cdot0.500$ $A5=\cos\theta\cdot(-0.331)-\sin\theta\cdot(-0.419)$ $A6=\cos\theta\cdot0.500-\sin\theta\cdot(-0.081)$ $A7=\sin\theta\cdot(-0.169)+\cos\theta\cdot0.500$ $A8=\sin\theta\cdot(-0.331)+\cos\theta\cdot(-0.419)$ $A9=\sin\theta\cdot0.500+\cos\theta\cdot(-0.081)$ $\alpha1=0, \alpha2=0, \alpha3=0,$ By adjusting a value of $\theta$, the hue can be adjusted.

Subsequently, it is assumed that the input signals are the luminance component data Y and two color difference component data $P_R$ and $P_B$ of the NTSC system and processed by the signal processing circuit 2 while keeping the form of the luminance component data Y and two color difference component data $P_R$ and $P_B$ and, thereafter, inversely converted to the 3-primary color signals R, G, and B by the second matrix circuit and generated. In this case, assuming that S1, S2, and S3 are Y, $P_R$, and $P_B$ and S4, S5, and S6 are R, G, and B in the equations (1), the first matrix coefficients are set as follows.

$(A1, A2, A3, \alpha1)=(1.0, 0, 0, 0)$ $(A4, A5, A6, \alpha2)=(0, 1.0, 0, 0)$ $(A7, A8, A9, \alpha3)=(0, 0, 1.0, 0)$ When it is assumed that S4, S5, and S6 are set to Y, $P_R$, and $P_B$ and S7, S8, and S9 are set to R, G, and B in the equations (2), the second matrix coefficients in the equations (2) are as follows.

$(C1, C2, C3, \beta1)=(1.0, 0, 1.402, 0)$ $(C4, C5, C6, \beta2)=(1.0, -0.344, -0.714, 0)$ $(C7, C8, C9, \beta3)=(1.0, 1.772, 0, 0)$ Also in this case, in a manner similar to the case of the R, G, and B inputs mentioned above, for example, by adjusting the values in the second matrix coefficient group, the signal form conversion from the luminance signal Y and color difference signals $P_R$ and $P_B$ to the 3-primary color signals R, G, and B and the various adjustments in the video signal can be executed in the second matrix circuit 3.

It is assumed that the input signals are in the form of the 3-primary color signals R, G, and B of the NTSC system, converted to the luminance signal Y and color difference signals $P_R$ and $P_B$ by the first matrix circuit 1, processed by the signal processing circuit 2, and thereafter, outputted in the form of the luminance signal Y and color difference signals $P_R$ and $P_B$. In this case, assuming that S1, S2, and S3 are R, G, and B and S4, S5, and S6 are Y, $P_R$, and $P_B$ in the equations (1), the first matrix coefficients are set as follows.

$(A1, A2, A3, \alpha1)=(0.299, 0.587, 0.114, 0)$ $(A4, A5, A6, \alpha2)=(-0.169, -0.331, 0.500, 0)$ $(A7, A8, A9, \alpha3)=(0.500, -0.419, -0.081, 0)$ When it is assumed that S4, S5, and S6 are set to Y, $P_R$, and $P_B$ and S7, S8, and S9 are set to Y, $P_R$, and $P_B$ in the equations (2), the second matrix coefficients in the equations (2) are as follows.

$(C1, C2, C3, \beta1)=(1.0, 0, 0, 0)$ $(C4, C5, C6, \beta2)=(0, 1.0, 0, 0)$ $(C7, C8, C9, \beta3)=(0, 0, 1.0, 0)$ Also in this case, in a manner similar to the case of the R, G, and B inputs mentioned above, for example, by adjusting the values in the first matrix coefficient group, the signal form. conversion from the 3-primary color signals R, G, and B to the luminance signal Y and color difference signals $P_R$ and $P_B$ and the various adjustments in the video signal can be executed in the first matrix circuit 1.

It is assumed that the input signals are in the form of the luminance signal Y and color difference signals $P_R$ and $P_B$ of the NTSC system and those signals are processed by the signal processing circuit 2, and thereafter, generated in the form of the luminance signal Y and color difference signals $P_R$ and $P_B$. In this case, assuming that S1, S2, and S3 are Y, $P_R$, and $P_B$ and S4, S5, and S6 are Y, $P_R$, and $P_B$ in the equations (1), the first matrix coefficients are set as follows.

$(A1, A2, A3, \alpha1)=(1.0, 0, 0, 0)$ $(A4, A5, A6, \alpha2)=(0, 1.0, 0, 0)$ $(A7, A8, A9, \alpha3)=(0, 0, 1.0, 0)$ When it is assumed that S4, S5, and S6 are set to Y, $P_R$, and $P_B$ and S7, S8, and S9 are set to Y, $P_R$, and $P_B$ in the equations (2), it is sufficient to set the second matrix coefficients in the equations (2) as follows.

$(C1, C2, C3, \beta1)=(1.0, 0, 0, 0)$ $(C4, C5, C6, \beta2)=(0, 1.0, 0, 0)$ $(C7, C8, C9, \beta3)=(0, 0, 1.0, 0)$ It is assumed that the input signals are the 3-primary color signals R, G, and B of the NTSC system and converted to the luminance signal Y and color difference signals $P_R$ and $P_B$ by the first matrix circuit 1, the adjustment of the hue is performed to the two color difference signals $P_R$ and $P_B$ by the signal processing circuit 2, and thereafter, the signals are inversely converted to the 3-primary color signals R, G, and B in!the second matrix circuit 3 and generated. In this case, the conversion from the 3-primary color signals R, G, and B to the luminance signal Y and two color difference signals $P_R$ and $P_B$ and the operation to rotate color difference coordinates axes for the two color difference signals $P_R$ and $P_B$ by a predetermined angle are executed in the first matrix circuit 1. After the adjustment of the hue, the conversion from the luminance signal Y and the two hue-adjusted color difference signals $P_R$ and $P_B$ to the 3-primary color signals R, G, and B and the operation to rotate color difference coordinates axes for the two color difference signals $P_R$ and $P_B$ in the opposite direction by a predetermined angle are executed in the second matrix circuit 3. The processes for the 3-primary color signals R, G, and B of the color difference signals $P_R$ and $P_B$, consequently, can be performed in a state where the coordinates axes have been rotated.

In this case, in the equations (1), S1, S2, and S3 are set to R, G, and B, S4, S5, and S6 are set to Y, $P_R$, and $P_B$, and the first matrix coefficients are set as follows.

$A1=0.299, A2=0.587, A3=0.114$ $A4=\cos\theta\cdot(-0.169)-\sin\theta\cdot0.500$ $A5=\cos\theta\cdot(-0.331)-\sin\theta\cdot(-0.419)$ $A6=\cos\theta\cdot 0.500-\sin\theta\cdot(-0.081)$ $A7=\sin\theta\cdot(-0.169)+\cos\theta\cdot 0.500$ $A8=\sin\theta\cdot(-0.331)+\cos\theta\cdot(-0.419)$ $A9=\sin\theta\cdot 0.500+\cos\theta\cdot(-0.081)$ $\alpha1=0, \alpha2=0, \alpha3=0.$ In the equations (2), S4, S5, and S6 are set to Y, $P_R$, and $P_B$, S7, S8, and S9 are set to R, G, and B, and the second matrix coefficients are set as follows.

$(C1, C2, C3, \beta1)=(1.0, \sin(-\theta)\cdot 1.402, \cos(-\theta)\cdot 1.402, 0)$ $(C4, C5, C6, \beta2)=(1.0, \cos(-\theta)\cdot(-0.344)+\sin(-\theta)\cdot(-0.714), -\sin(-\theta)\cdot(-0.344)+\cos(-\theta)\cdot(-0.714), 0)$ $(C7, C8, C9, \beta3)=(1.0, \cos(-\theta)\cdot 1.772, \sin(-\theta)\cdot 1.772, 0)$ By adjusting the value of $\theta$ to a predetermined value, the processes of the color difference signals can be performed in the state where the color difference coordinates axes have been rotated.

In the embodiment, although the example in which the processes in the signal processing circuit 2 are executed in thei signal forms of the luminance signal Y and color difference signals $P_R$ and $P_B$ has been shown, the invention is not limited to it. Also in case of performing the processes in the signal processing circuit 2 by the signal form of the 3-primary color signals R, G, and B, the conversion between the luminance signal Y and two color difference signals $P_R$ and $P_B$ and the 3-primary color signals R, G, and B and the adjustment of at least one of the contrast, brightness, color, hue, and white balance to the input video signal can be aiso performed in the first or second matrix circuit 1 or 3.

For example, it is assumed that the Y, $P_R$, and $P_B$ inputs of the NTSC system are converted to the R, G, and B signals by the first matrix circuit 1 and processed and, thereafter, converted to the Y, $P_R$, and $P_B$ outputs by the second matrix circuit 3. In this case, assuming that S1, S2, and S3 are Y, $P_R$, and $P_B$ and S4, S5, and S6 are R, G, and B in the equations (1), the first matrix coefficients are set as follows.

$(A1, A2, A3, \alpha1)=(1.0, 0, 1.402, 0)$ $(A4, A5, A6, \alpha2)=(1.0, -0.344, -0.714, 0)$ $(A7, A8, A9, \alpha3)=(1.0, 1.772, 0, 0)$ When it is assumed that S4, S5, and S6 are set to R, G and B and S7, S8, and S9 are set to Y, $P_R$, and $P_B$ in the equations (2), the second matrix coefficients in the equations (2) are as follows.

$(C1, C2, C3, \beta1)=(0.299, 0.587, 0.114, 0)$ $(C4, C5, C6, \beta2)=(-0.169, -0.331, 0.500, 0)$ $(C7, C8, C9, \beta3)=(0.500, -0.419, -0.081, 0)$ In case of increasing the contrast 1.5 times in the first matrix circuit 1, the values of the coefficients A1, A4, and A7 in the first matrix coefficient group in the equations (1) are increased 1.5 times and the values in the first matrix coefficient group are set as follows.

$(A1, A2, A3, \alpha1)=(1.5, 0, 1.402, 0)$ $(A4, A5, A6, \alpha2)=(1.5, -0.344, -0.714, 0)$ $(A7, A8, A9, \alpha3)=(1.5, 1.772, 0, 0)$ In case of increasing the contrast 1.5 times in the second matrix circuit 3, the values of the coefficients A1 to A9 in the second matrix coefficient group in the equations (2) are adjusted and the values in the second matrix coefficient group are set as follows.

$(C1, C2, C3, \beta1)=(0.449, 0.881, 0.171, 0)$ $(C4, C5, C6, \beta2)=(-0.169, -0.331, 0.500, 0)$ $(C7, C8, C9, \beta3)=(0.500, -0.419, -0.081, 0)$ As described above, according to the first aspect of the invention, after the 3-primary color signals R, G, and B or the luminance signal Y and two color difference signals PR and $P_B$ serving as input signals were first matrix converted, the signal processes to adjust the picture display form are performed, and when the matrix conversion is performed to the processed signals and the resultant signals are generated as luminance signal Y and two color difference signals $P_R$ and $P_B$ or 3-primary color signals R, G, and B, the matrix arithmetic operations in the.first and second matrix conversions are executed in dependence on the variable coefficient groups, so that the first or second matrix conversion and the adjustment of the contrast, brightness, color, hue, white balance, or the like can be performed.

An embodiment of a color adjusting circuit of the invention will now be described hereinbelow with reference to the drawings.

Figure 2:
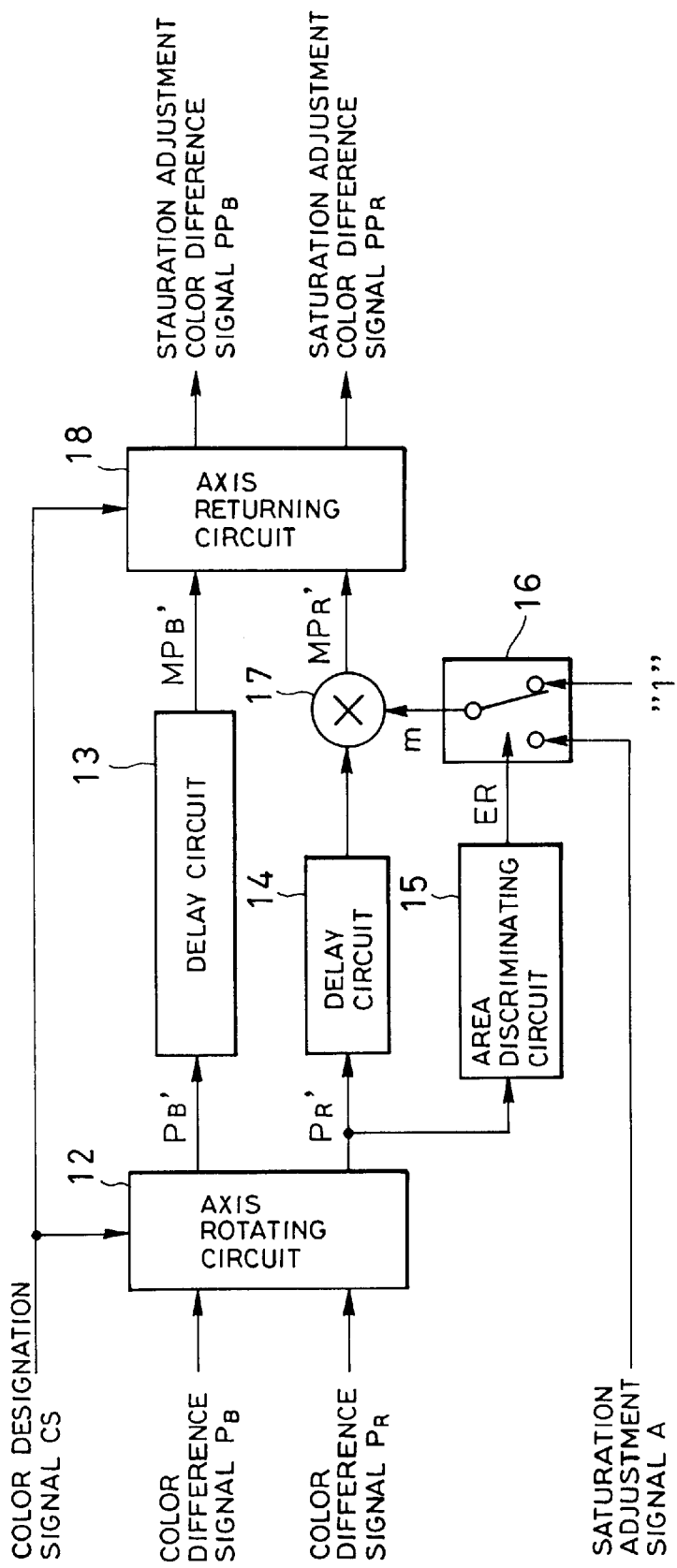
FIG. 2 is a diagram showing an example of a construction of a saturation adjusting circuit as a color adjusting circuit according to the invention.

FIG. 2 is a diagram showing a construction of a saturation adjusting circuit serving as a color adjusting circuit according to the invention.

In FIG. 2, an axis rotating circuit 12 performs the following rotary coordinate transforming arithmetic operations to each of a color difference signal $P_B$ and a color difference signal $P_R$, thereby rotating color coordinates shown by the color difference signal $P_B$ and color difference signal $P_R$ by an angle of $-\theta$ while 0 values of both of them are set to a center axis and thereby obtaining a rotated color difference signal $P_B'$ and a rotated color difference signal $P_R'$, respectively.

$P_B'=\cos(-\theta)\cdot P_B-\sin(-\theta)\cdot P_R$ $P_R'=\sin(-\theta)\cdot P_B+\cos(-\theta)\cdot P_R$ where, color difference signal $P_B$:$E_B-E_Y$ color difference signal $P_R$:$E_R-E_Y$ For example, assuming that the supplied color difference signals $P_B$ and $P_R$ are set to $(P_{B1}, P_{R1})$ as shown by a white circle in FIG. 3A, respectively, they are converted to rotated color difference signals $(P_{B1}', P_{R1}')$ as shown by a white triangle by the axis rotating circuit 12.

The color difference signals $P_B$ and $P_R$ correspond to color difference signals $(E_B-E_Y)$ and $(E_R-E_Y)$ in a color video signal. The sign $-\theta$ in the explanation of the axis rotating circuit 12 represents an angle which is arbitrarily designated in response to a color designation signal CS.

On the basis of a polarity of the rotated color difference signal $P_R'$, an area discriminating circuit 15 discriminates whether the color components shown by the color difference signals $P_B$ and $P_R$ exist in a color region having a color tendency in which the color shown by the color designation signal CS is set to a center or not. In accordance with a discrimination result, the area discriminating circuit 15 supplies an area discrimination signal ER to a selector 16. For example, when the color designation signal CS indicates +θ as shown in FIG. 3A, a range surrounded by the one-dot chain line in the diagram is a color region having the color tendency in which the color shown by the color designation signal CS is set to a center. In this process, it is possible to determine that if the rotated color difference signal $P_R'$ has a positive polarity, the color difference signals $P_B$ and $P_R$ exist in the color region surrounded by the one-dot chain line in FIG. 3A, and that if the signal $P_R'$ has a negative polarity, the signals $P_B$ and $P_R$ exist out of this color region. When it is determined that the color difference signals $P_B$ and $P_R$ exist in the color region surrounded by the one-dot chain line in FIG. 3A, the area discriminating circuit 15 supplies the area discrimination signal ER at the logic level "1" to the selector 16. When it is determined that the signals $P_B$ and $P_R$ exist out of the color region, the area discriminating circuit 15 supplies the area discrimination signal ER at the logic level "0" to the selector 16.

When the area discrimination signal ER is at the logic level "0", the selector 16 supplies "1" as a multiplicand m to a multiplier 17. When the area discrimination signal ER is at the logic level "1", the selector 16 supplies a saturation adjustment signal A as a multiplicand m to the multiplier 17. A delay circuit 14 delays the rotated color difference signal $P_R'$ by a processing time that is spent in each of the area discriminating circuit 15 and selector 16 and supplies the delayed signal to the multiplier 17.

The multiplier 17 multiplies the rotated color difference signal $P_R'$ supplied from the delay circuit 14 by the multiplicand m supplied from the selector 16 and transmits an obtained value as a rotated color difference signal $MP_R'$ to an axis returning circuit 18.

That is, when the color difference signals $P_B$ and $P_R$ exist out of the color region surrounded by the one-dot chain line in FIG. 3A, the multiplier 17 supplies the rotated color difference signal $P_R'$ as it is as a rotated color difference signal $MP_R'$ to the axis returning circuit 18. When the color difference signals $P_B$ and $P_R$ exist in the color region surrounded by the one-dot chain line in FIG. 3A, the multiplier 17 multiplies the rotated color difference signal $P_R'$ by the saturation adjustment signal A, thereby adjusting the level of the rotated color difference signal $P_R'$ in accordance with the saturation adjustment signal A. The multiplier 17 supplies a resultant signal as a rotated color difference signal $MP_R'$ to the axis returning circuit 18. A delay circuit 13 delays the rotated color difference signal $P_B'$ supplied from the axis rotating circuit 12 by a time obtained by adding the time that is spent in the multiplying process of the multiplier 17 to the delay time due to the delay circuit 14, and supplies the delayed signal as a rotated color difference signal $MP_B'$ to the axis returning circuit 18.

For example, as shown in FIG. 3B, as for the rotated color difference signals ($P_{B1}'$, $P_{R1}'$) obtained by the axis rotating circuit 12, since their original color difference signals ($P_{B1}'$, $P_{R1}'$) exist in the color region surrounded by the one-dot chain line in FIG. 3A, the rotated color difference signals ($MP_{B1}'$, $MP_{R1}'$) as shown by a black triangle and in which only the rotated color difference signal $P_{R1}'$ has been multiplied by "A" are supplied to the axis returning circuit 18.

The axis returning circuit 18 performs the following arithmetic operations to each of the rotated color difference signals $MP_{B1}'$ and $MP_{R1}'$, so that the color coordinates rotated by the axis rotating circuit 12 are rotated by (the angle corresponding to the color designation signal CS)+θ and they are returned to the original signals and generated as saturation adjustment color difference signals $PP_B$ and $PP_R$, respectively.

$PP_B = \cos(+\theta) \cdot MP_B - \sin(+\theta) \cdot MP_R$ $PP_R = \sin(+\theta) \cdot MP_B + \cos(+\theta) \cdot MP_R$ For example, as shown in FIG. 3C, the rotated color difference signals ($MP_{B1}'$, $MP_{R1}'$) as shown by a black triangle are rotated by an angle of +θ by the axis returning circuit 18, and converted to saturation adjustment color difference signals ($PP_{B1}$ and $PP_{R1}$) as shown by a black circle. That is, according to the saturation adjusting circuit as shown in FIG. 2, the color difference signals ($P_{B1}$, $P_{R1}$) shown by the white circle are converted to the saturation adjustment color difference signals ($PP_{B1}$ and $PP_{R1}$) as shown by the black circle.

Figure 4:
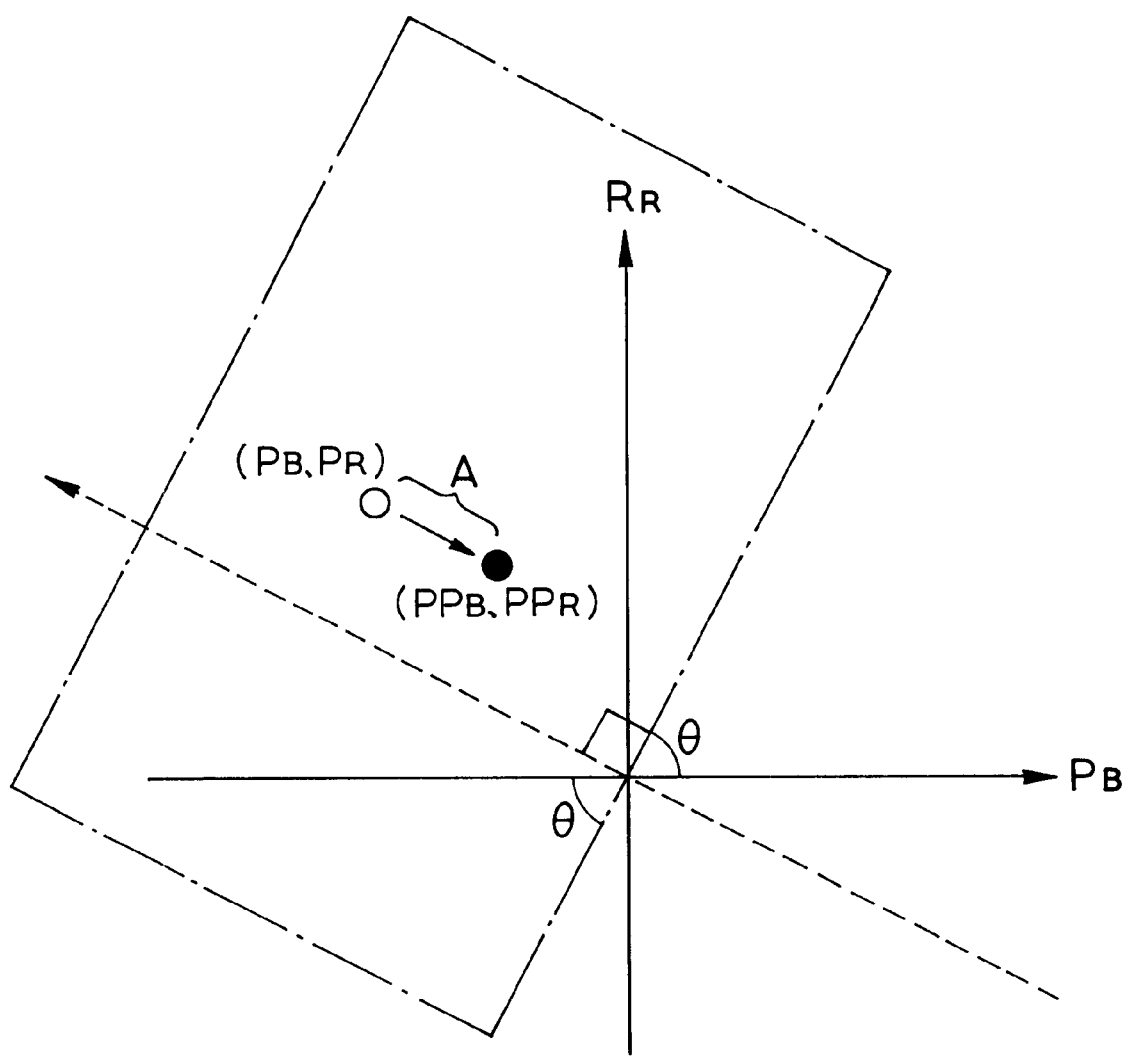
FIG. 4 is a diagram for explaining the saturation adjusting operation by the saturation adjusting circuit shown in FIG. 2.

By performing the image display based on the saturation adjustment color difference signals $PP_B$ and $PP_R$, the color region having the tendency of the color shown by the color designation signal CS, namely, only the color component belonging to a color region shown by the one-dot chain dash line in FIG. 4 becomes a target of the saturation adjustment and the saturation adjustment according to the saturation adjustment signal A is performed.

In the above embodiment, the color components (color difference signals $P_B$ and $P_R$) existing in the color region shown by the one-dot chain line in FIG. 4 in which the color shown by the color designation signal CS is set to a center become targets of the saturation adjustment. The target color of the saturation adjustment can be also further limited into the color itself designated by the color designation signal CS.

Figure 5:
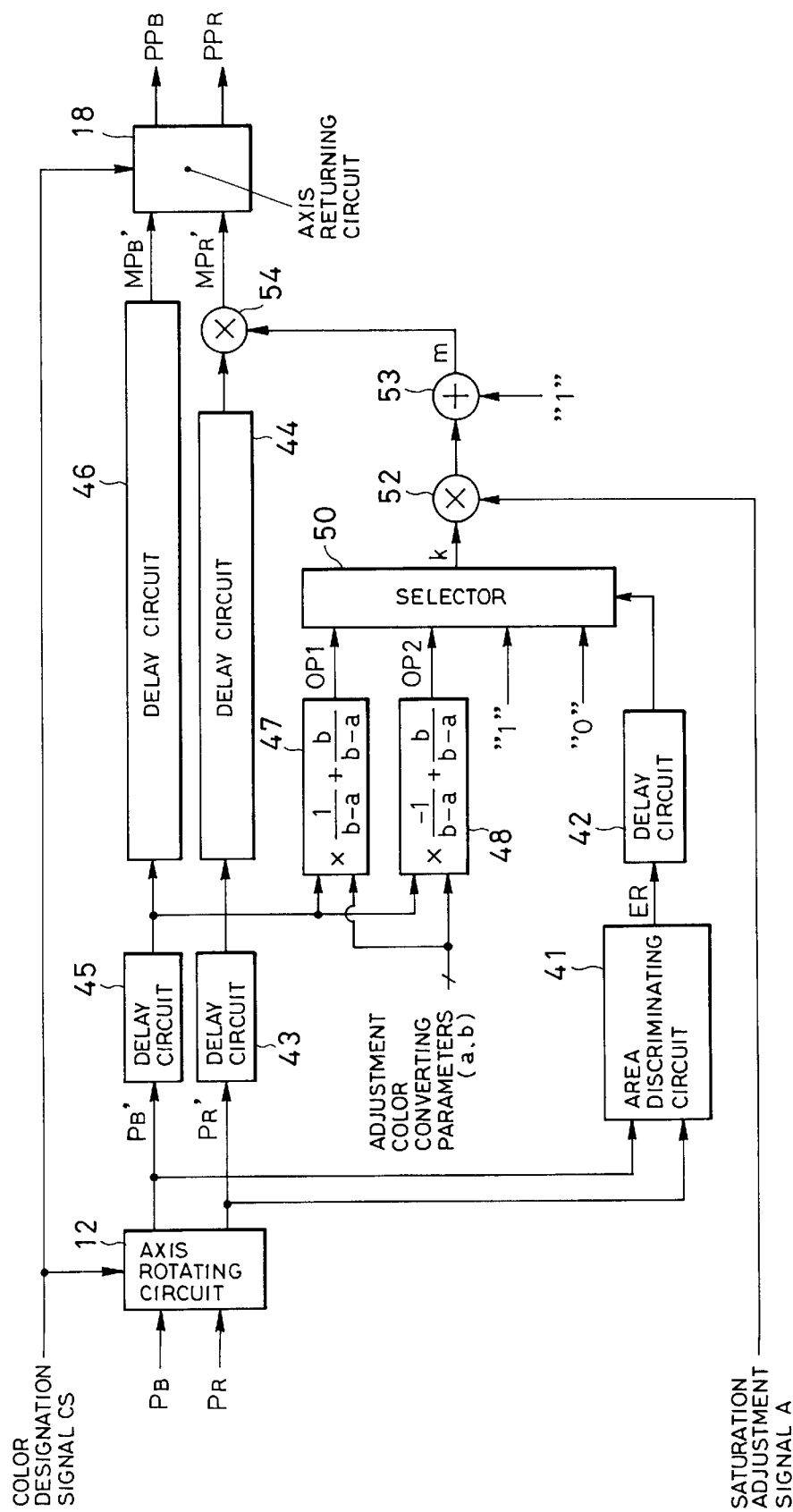
FIG. 5 is a diagram showing another example of the saturation adjusting circuit.

FIG. 5 is a diagram showing another embodiment of a saturation adjusting circuit made in consideration of the above points.

In FIG. 5, the axis rotating circuit 12 performs the following rotary coordinate transforming arithmetic operation to the color difference signals $P_B$ and $P_R$, so that the color coordinates shown by the color difference signals $P_B$ and $P_R$ are rotated by an angle of −θ while 0 values of both of them are set to a center axis, thereby obtaining the rotated color difference signal $P_B'$ and rotated color difference signal $P_R'$, respectively.

Figure 6:
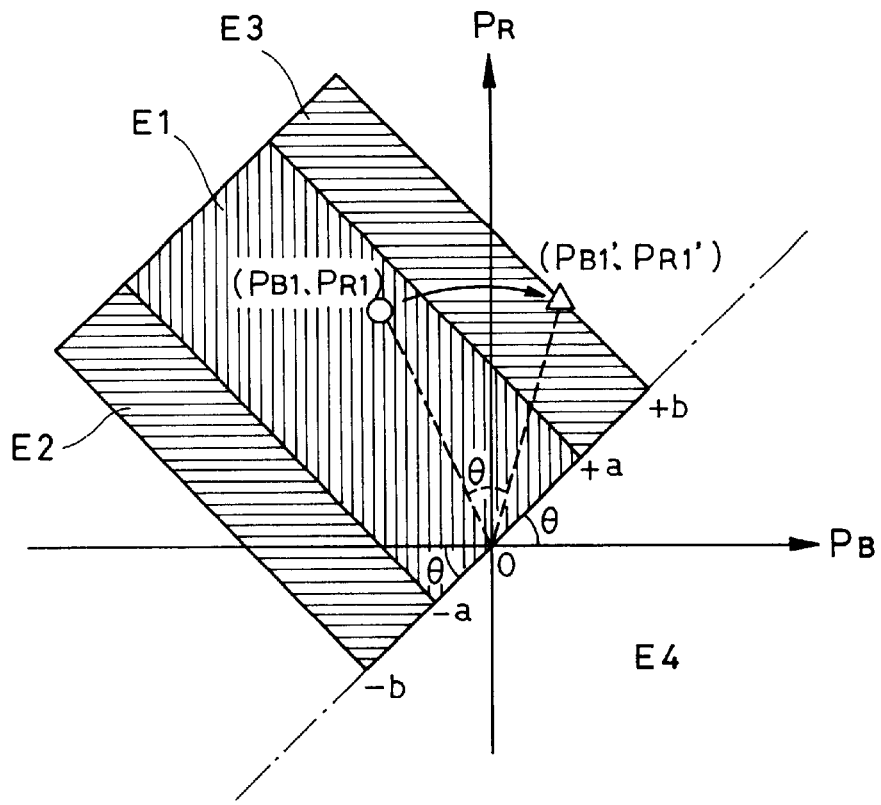
FIG. 6 is a diagram for explaining the internal operation in the saturation adjusting circuit shown in FIG. 5.

$P_B' = \cos(-\theta) \cdot P_B - \sin(-\theta) \cdot P_R$ $P_R' = \sin(-\theta) \cdot P_B + \cos(-\theta) \cdot P_R$ where, color difference signal $P_B:E_B-E_Y$ color difference signal $P_R:E_R-E_Y$ For example, assuming that the supplied color difference signals $P_B$ and $P_R$ are set to ($P_{B1}$, $P_{R1}$) as shown by a white circle in FIG. 6, respectively, they are converted to the rotated color difference signals ($P_{B1}'$, $P_{R1}'$) as shown by a white triangle by the axis rotating circuit 12.

The color difference signals $P_B$ and $P_R$ correspond to the color difference signals ($E_B-E_Y$) and ($E_R-E_Y$) in a color video signal. The sign −θ in the axis rotating circuit 12 denotes an angle which is arbitrarily designated in response to the color designation signal CS.

An area discriminating circuit 41 discriminates whether the color difference signals $P_B$ and $P_R$ exist in a color region E having the tendency of the color shown by the color designation signal CS as shown in FIG. 6 or exist in a color region E4 out of the color tendency, or exists in a color region E2 or E3 as a transition region between the color regions E1 and E4 or not and supplies the area discrimination signal ER according to a discrimination result to the selector 16.

The area discriminating circuit 41 performs the area discrimination on the basis of the values of the rotated color difference signals $P_B'$ and $P_R'$.

That is, when each of the rotated color difference signals $P_R'$ and $P_B'$ is as follows, $$P_R' \geq 0$$

$$-b < P_B' < -a$$

the area discriminating circuit 41 supplies the area discrimination signal ER indicating that the color difference signals $P_B$ and $P_R$ exist in the color region E2 to a delay circuit 42.

When each of the rotated color difference signals $P_R'$ and $P_B'$ is as follows, $$P_R' \geq 0$$

$$|P_B'| \leq a$$

the area discriminating circuit 41 supplies the area discrimination signal ER indicating that the color difference signals $P_B$ and $P_R$ exist in the color region E1 to the delay circuit 42.

When each of the rotated color difference signals $P_R'$ and $P_B'$ is as follows, $$P_R' \geq 0$$

$$a < P_B' < b$$

the area discriminating circuit 41 supplies the area discrimination signal ER indicating that the color difference signals $P_B$ and $P_R$ exist in the color region E3 to the delay circuit 42.

When each of the rotated color difference signals $P_R'$ and $P_B'$ does not satisfy any of the above conditions, the area discriminating circuit 41 supplies the area discrimination signal ER indicating that the color difference signals $P_B$ and $P_R$ exist in the color region E4 out of the color regions E1 to E3 to the delay circuit 42.

In this instance, the color region E1 in FIG. 6 is an existing region of the color component having the color tendency serving as a main target of the saturation adjustment, and the color region E4 is an existing region of the color component out of the target of the saturation adjustment. The color regions E2 and E3 are color regions set so as to make the transition of the saturation adjustment between the color regions E1 and E4 smooth by reducing an applying degree of the saturation adjustment to a value smaller than that in the region E1.

"a" and "b" denote the adjustment color converging parameters for converging the color which should become the target of the saturation adjustment. For example, when the parameter "a" is reduced, since a width (−a~a) of the color region E1 as shown in FIG. 6 is narrowed, the color tendency of the color which should become the target of the saturation adjustment is converged to the color itself shown by the color designation signal CS. In this instance, the parameter "b" is provided to set a width of a boundary area as shown in the color regions E2 and E3.

A delay circuit 43 delays the rotated color difference signal $P_R'$ by a processing time that is spent in the area discriminating circuit 41 and supplies the delayed signal to a delay circuit 44. A delay circuit 45 also similarly delays the rotated color difference signal $P_B'$ by a processing time that is spent in the area discriminating circuit 41 and supplies the delayed signal to each of a delay circuit 46 and arithmetic operating circuits 47 and 48.

The arithmetic operating circuit 47 performs the following arithmetic operation to the rotated color difference signal $P_B'$ which was delayed by the delay circuit 45 and supplied, and transmits an obtained arithmetic operation result OP1 to a selector 50.

$$OP1 = \{P_B'/(b-a)\} + b/(b-a)$$

a, b: adjustment color converging parameters

An arithmetic operating circuit 48 performs the following arithmetic operation to the rotated color difference signal $P_B'$ which was delayed by the delay circuit 45 and supplied, and transmits an obtained arithmetic operation result OP2 to the selector 50.

$$OP2 = \{-P_B'/(b-a)\} + b/(b-a)$$

a, b: adjustment color converging parameters

The delay circuit 42 delays the area discrimination signal ER supplied from the area discriminating circuit 41 by the longer one of the arithmetic operation processing time which is spent by the arithmetic operating circuit 47 and the arithmetic operation processing time which is spent by the arithmetic operating circuit 48 and transmits the delayed signal to the selector 50.

The selector 50 selects one value according to the area discrimination signal ER (delayed by the delay circuit 42) among the four values of the arithmetic operation results OP1 and OP2 and "1" and "0" and supplies the selected value as a saturation adjustment coefficient k to a multiplier 52.

Figure 7:
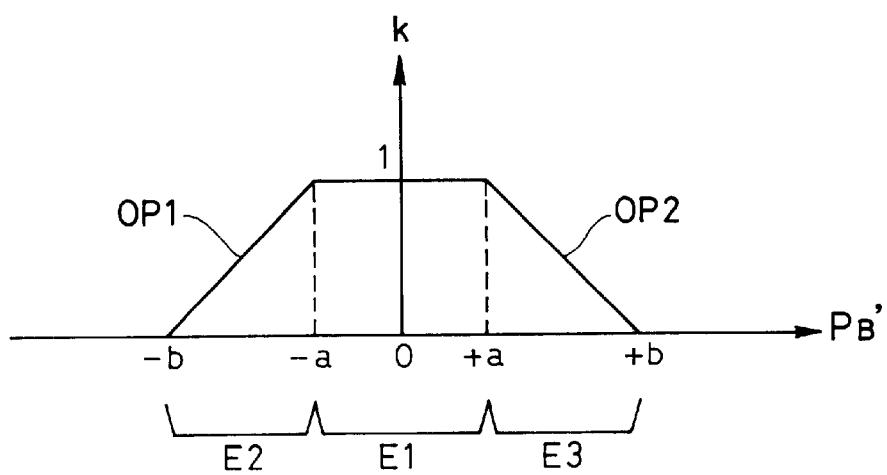
FIG. 7 is a diagram showing a saturation adjustment coefficient k.

That is, as shown in FIG. 7, when the area discrimination signal ER indicates the color region E2 in FIG. 6, the selector 50 selects the arithmetic operation result OP1. When it indicates the color region E1, the selector 50 selects "1". When it indicates the color region E3, the selector 50 selects the arithmetic operation result OP2. When it indicates the color region E4, the selector 50 selects "0". The selector supplies the selected value as a saturation adjustment coefficient k to a multiplier 52.

The multiplier 52 multiplies the saturation adjustment signal A by the saturation adjustment coefficient k having a transition as shown in FIG. 7 and supplies an obtained multiplication result to an adder 53. The adder 53 adds "1" to the multiplication result and supplies an obtained addition result as a multiplicand m to a multiplier 54.

The delay circuit 44 further delays the rotated color difference signal $P_R'$ which was delayed by the delay circuit 43 and supplied by the time obtained by adding the processing time which is spent in each of the delay circuit 42, selector 50, multiplier 52, and adder 53 and supplies the delayed signal to the multiplier 54.

The multiplier 54 multiplies the rotated color difference signal $P_R'$ which was delayed by the delay circuits 43 and 44 and supplied by the multiplicand m supplied from the adder 53 and transmits an obtained value as a rotated color difference signal $MP_R'$ to the axis returning circuit 18.

That is, when the area discrimination signal ER indicates the color region E4, the multiplier 54 supplies the rotated color difference signal $P_R'$ as it is as a rotated color difference signal $MP_R'$ to the axis returning circuit 18. When the area discrimination signal ER indicates the color region E1, the multiplier 54 multiplies the rotated color difference signal $P_R'$ by (A+1), thereby adjusting the level of the rotated color difference signal $P_R'$ in accordance with the saturation adjustment signal A. The multiplier 54 supplies a resultant signal as a rotated color difference signal $MP_R'$ to the axis returning circuit 18.

When the area discrimination signal ER indicates the color region E2, the multiplier 54 multiplies the rotated color difference signal $P_R'$ by $$[\{A(-P_B'+b)/(b-a)\}+1],$$

thereby adjusting the level of the rotated color difference signal $P_R'$, and supplies a resultant signal as a rotated color difference signal $MP_R'$ to the axis returning circuit 18.

When the area discrimination signal ER indicates the color region E3, the multiplier 54 multiplies the rotated color difference signal $P_R'$ by $$[\{A(P_B'+b)/(b-a)\}+1],$$

thereby adjusting the level of the rotated color difference signal $P_R'$, and supplies a resultant signal as a rotated color difference signal $MP_R'$ to the axis returning circuit 18.

The delay circuit 46 further delays the rotated color difference signal $P_B'$ which was delayed by the delay circuit 45 and supplied by the time obtained by adding the processing time which is spent in each of the delay circuit 44 and multiplier 54 and supplies the delayed signal as a rotated color difference signal $MP_B'$ to the axis returning circuit 18.

The axis returning circuit 18 performs the following arithmetic operations to each of the rotated color difference signals $MP_B'$ and $MP_R'$, thereby allowing the color coordinates rotated by the axis rotating circuit 12 to be rotated by (the angle according to the color designation signal CS)+θ and returning it to the original signals. The axis returning circuit 18 generates the resultant signals as saturation adjustment color difference signals $PP_B$ and $PP_R$, respectively.

$$PP_B = \cos(+\theta) \cdot MP_B - \sin(+\theta) \cdot MP_R$$

$$PP_R = \sin(+\theta) \cdot MP_B + \cos(+\theta) \cdot MP_R$$

Figure 8:
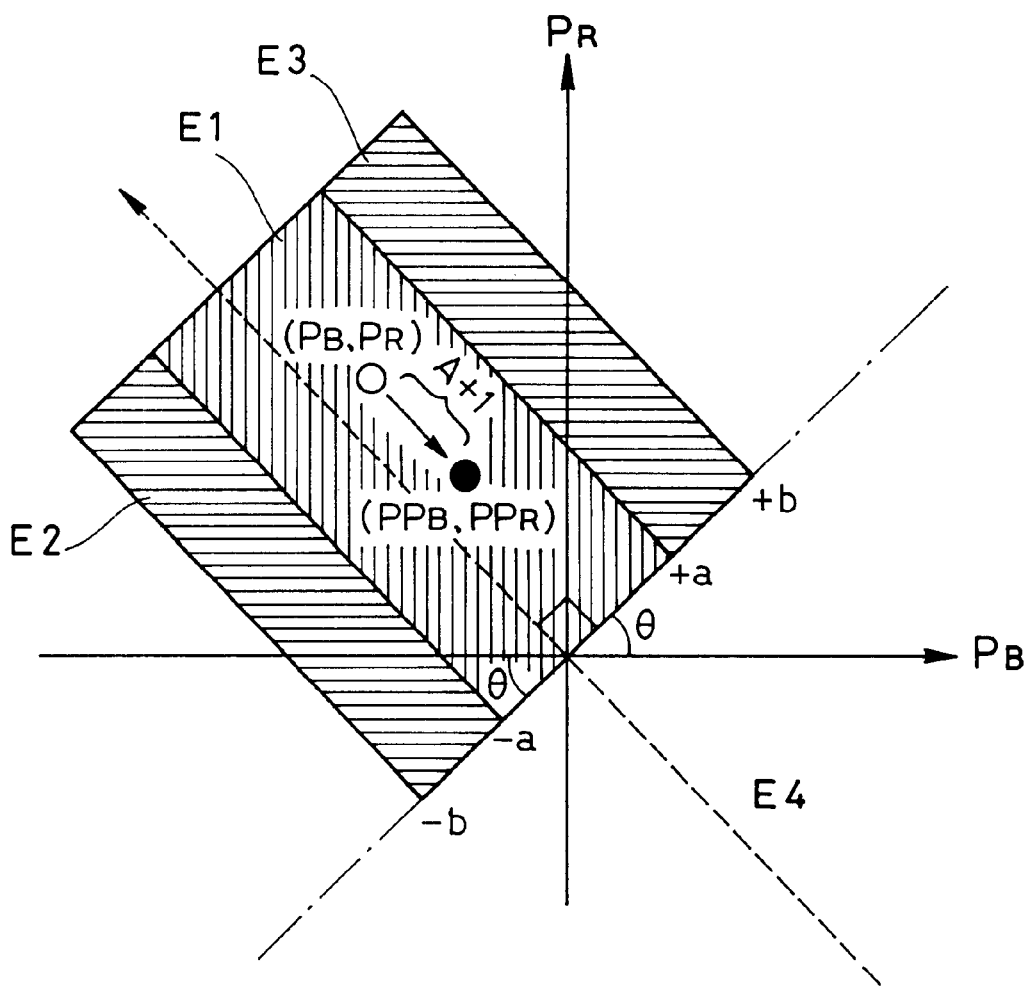
FIG. 8 is a diagram for explaining the saturation adjusting operation by the saturation adjusting circuit shown in FIG. 5.

By performing the image display based on the saturation adjustment color difference signals $PP_B$ and $PP_R$, therefore, the color component (color difference signals $P_B$ and $P_R$) existing in the color region in which the tendency of the color shown by the color designation signal CS has been further converged by the parameter a, namely, in the color region E1 in FIG. 8 is set to a main target of the saturation adjustment. The saturation adjustment of (A+1) according to the saturation adjustment signal A is performed.

Although the embodiments shown in FIGS. 2 to 8 have been described with respect to the circuit for performing the saturation adjustment as an example of the color adjusting circuit, the color adjustment is not limited to the saturation adjustment.

Figure 9:
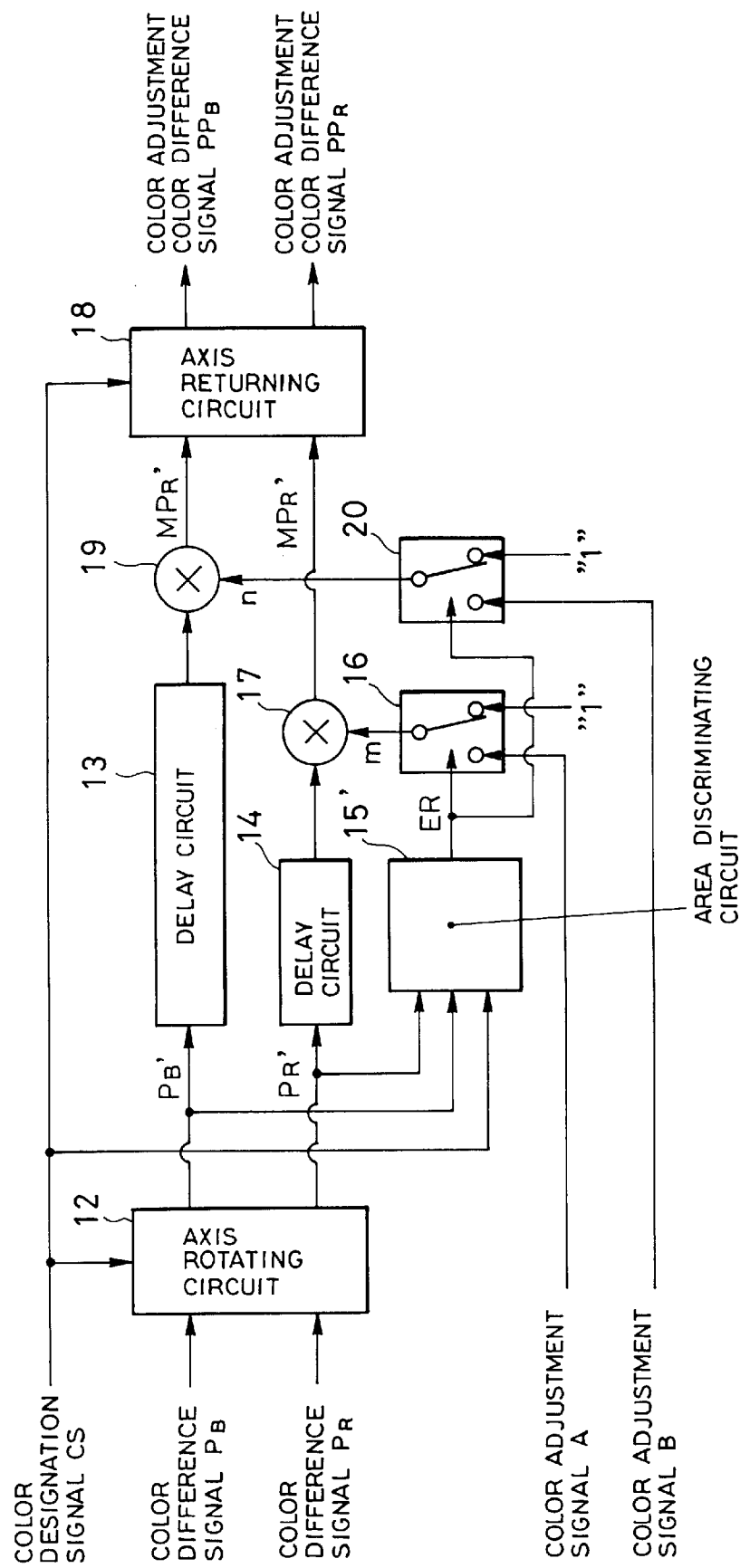
FIG. 9 is a diagram showing the structure of a color adjusting circuit according to the invention which can perform a saturation adjustment and a hue adjustment.

FIG. 9 is a diagram showing a construction of a color adjusting circuit according to the invention which can perform not only the saturation adjustment but also the hue adjustment.

In FIG. 9, the axis rotating circuit 12 performs the following rotary coordinate transforming arithmetic operation to each of the color difference signals $P_B$ and $P_R$, thereby rotating the color coordinates shown by the color difference signals $P_B$ and $P_R$ by an angle of −θ while setting the 0 values of both of them to a center axis and obtaining the rotated color difference signals $P_B'$ and $P_R'$, respectively.

$$P_B' = \cos(-\theta) \cdot P_B - \sin(-\theta) \cdot P_R$$

$$P_R' = \sin(-\theta) \cdot P_B + \cos(-\theta) \cdot P_R$$

where, color difference signal $P_B : E_B - E_Y$
color difference signal $P_R : E_R - E_Y$ For example, assuming that the supplied color difference signals $P_B$ and $P_R$ are set to $(P_{B1}, P_{R1})$ as shown by a white circle in FIG. 10A, respectively, they are converted by the axis rotating circuit 12 to rotated color difference signals $(P_{B1}', P_{R1}')$ as shown by a white triangle.

The color difference signals $P_B$ and $P_R$ correspond to color difference signals $(E_B-E_Y)$ and $(E_R-E_Y)$ in a color video signal. The sign −θ in the explanation of the axis rotating circuit 12 represents an angle which is arbitrarily designated in response to a color designation signal CS.

Figure 10C:
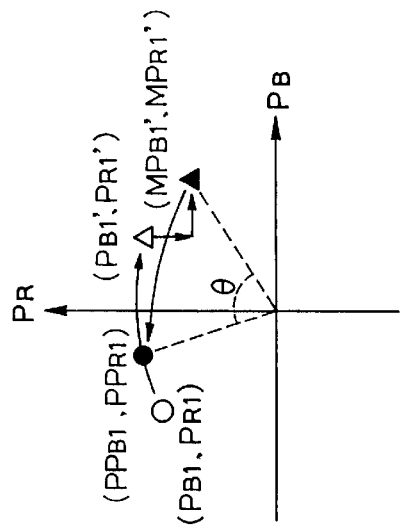
FIGS. 10A to 10C are diagrams for explaining the internal operation in the color adjusting circuit shown in FIG. 9.

An area discriminating circuit 15' first sets a color region (color region serving as a target of the color adjustment) in which the color designated by the color designation signal CS is set as a center. For example, when the color designation signal CS indicates +θ as shown in FIG. 10A, a range surrounded by the one-dot chain line in the diagram is a color region in which the color designated by the color designation signal CS is set to a center. On the basis of the rotated color difference signals $P_B'$ and $P_R'$, the area discriminating circuit 15' discriminates whether the color coordinates shown by the color difference signals $P_B$ and $P_R$ exist in this color region or not, and supplies the area, discrimination signal ER indicative of a discrimination result to each of selectors 16 and 20. For example, when it is determined that the color coordinates shown by the color difference signals $P_B$ and $P_R$ exist in the color region surrounded by the one-dot chain line in FIG. 10A, the area discriminating circuit 15' supplies the area discrimination signal ER at the logic level "1" to each of the selectors 16 and 20. When it is determined that the color coordinates exist out of this color region, the area discriminating circuit 15' supplies the area discrimination signal ER at the logic level "0" to each of the selectors 16 and 20.

When the area discrimination signal ER is at the logic level "0", the selector 16 supplies "1" as a multiplicand m to the multiplier 17. When the area discrimination signal ER is at the logic level "1", the selector 16 supplies the color adjustment signal A as a multiplicand m to the multiplier 17. The delay circuit 14 delays the rotated color difference signal $P_R'$ by a processing time that is spent in each of the area discriminating circuit 15' and selector 16 and supplies the delayed signal to the multiplier 17.

The multiplier 17 multiplies the rotated color difference signal $P_R'$ supplied from the delay circuit 14 by the multiplicand m supplied from the selector 16 and transmits an obtained value as a rotated color difference signal $MP_R'$ to the axis returning circuit 18. That is, when the color difference signals $P_B$ and $P_R$ exist out of the color region surrounded by the one-dot chain line in FIG. 10A, the multiplier 17 supplies the rotated color difference signal $P_R'$ as it is as a rotated color difference signal $MP_R'$ to the axis returning circuit 18. When the color difference signals $P_B$ anid $P_R$ exist in the color region surrounded by the one-dot chain line in FIG. 10A, the multiplier 17 multiplies the rotated color difference signal $P_R'$ by the color adjustment signal A, thereby adjusting the level of the rotated color difference signal $P_R'$. The multiplier 17 supplies a resultant signal as a rotated color difference signal $MP_R'$ to the axis returning circuit 18.

When the area discrimination signal ER is at the logic level "0", the selector 20 supplies "1" as a multiplicand n to a multiplier 19. When the area discrimination signal ER is at the logic level "1", the selector 20 supplies a color adjustment signal B as a multiplicand n to the multiplier 19. The delay circuit 13 delays the rotated color difference signal $P_B'$ supplied from the axis rotating circuit 12 by a time obtained by adding a time that is spent in the multiplying process of the multiplier 17 to the delay time due to the delay circuit 14 and supplies the delayed signal to the multiplier 19.

The multiplier 19 multiplies the rotated color difference signal $P_B'$ supplied from the delay circuit 13 by the.multiplicand n supplied from the selector 20 and transmits an obtained value as a rotated color difference signal $MP_B'$ to the axis returning circuit 18. That is, when the color difference signals $P_B$ and $P_R$ exist out of the color region surrounded by the one-dot chain line in FIG. 10A, the multiplier 19 supplies the rotated color difference signal $P_B'$ as it is as a rotated color difference signal $MP_R'$ to the axis returning circuit 18. When the color difference signals $P_B$ and $P_R$ exist in the color region surrounded by the one-dot chain line in FIG. 10A, the multiplier 19 multiplies the rotated color difference signal $P_B'$ by the color adjustment signal B, thereby adjusting the level of the rotated color difference signal $P_B'$. The multiplier 19 supplies a resultant signal as a rotated color difference signal $MP_B'$ to the axis returning circuit 18.

Only when the color coordinates by the color difference signals $P_B$ and $P_R$ exist in the color region designated by the color designation signal CS, the multipliers 17 and 19 adjust the levels of the rotated color difference signals $P_B'$ and $P_R'$ by the color adjustment signals A and B, respectively, and supply the resultant signals as rotated color difference signals $MP_B'$ and $MP_R'$ to the axis returning circuit 18, respectively.

Figure 10B:
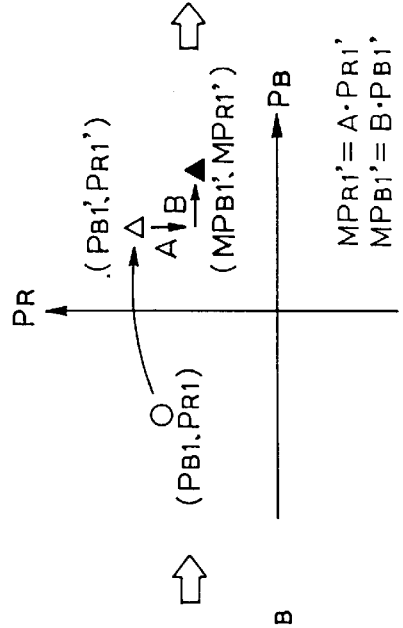
Figure 10A:
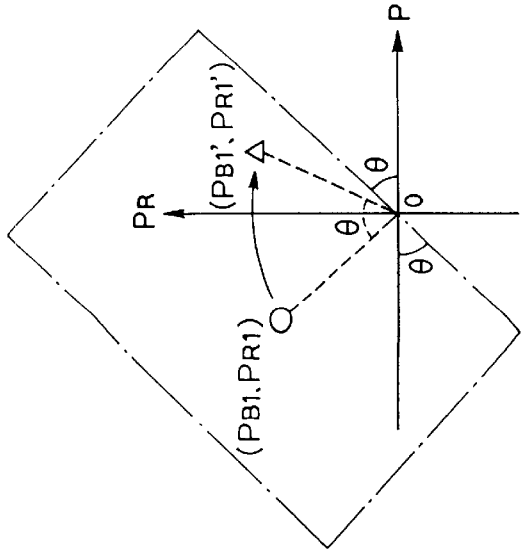

For example, the rotated color difference signal $P_{R1}'$ between the rotated color difference signals $(P_{B1}', P_{R1}')$ as shown by a white triangle in FIG. 10B is increased "A" times in accordance with the color adjustment signal A and the rotated color difference signal $P_{B1}'$ is increased "B" times in accordance with the color adjustment signal B, so that the resultant signals become the rotated color difference signals $(MP_{B1}', MP_{R1}')$ as shown by a black triangle in FIG. 10B.

The axis returning circuit 18 performs the following arithmetic operations to each of the rotated color difference signals $MP_B'$ and $MP_R'$, so that the color coordinates rotated by the axis rotating circuit 12 are rotated by (the angle corresponding to the color designation signal CS) $+\theta$ and they are returned to the original signals and generated as color adjustment color difference signals $PP_B$ and $PP_R$, respectively.

$$PP_B = \text{COS}(+\theta) \cdot MP_B - \text{SIN}(+\theta) \cdot MP_R$$

$$PP_R = \text{SIN}(+\theta) \cdot MP_B + \text{COS}(+\theta) \cdot MP_R$$

For example, as shown in FIG. 10C, the rotated color difference signals $(MP_{B1}', MP_{R1}')$ as shown by a black triangle are rotated by an angle of $+\theta$ by the axis returning circuit 18, and converted to color adjustment color difference signals $(PP_{B1}$ and $PP_{R1})$ as shown by a black circle.

Figure 11:
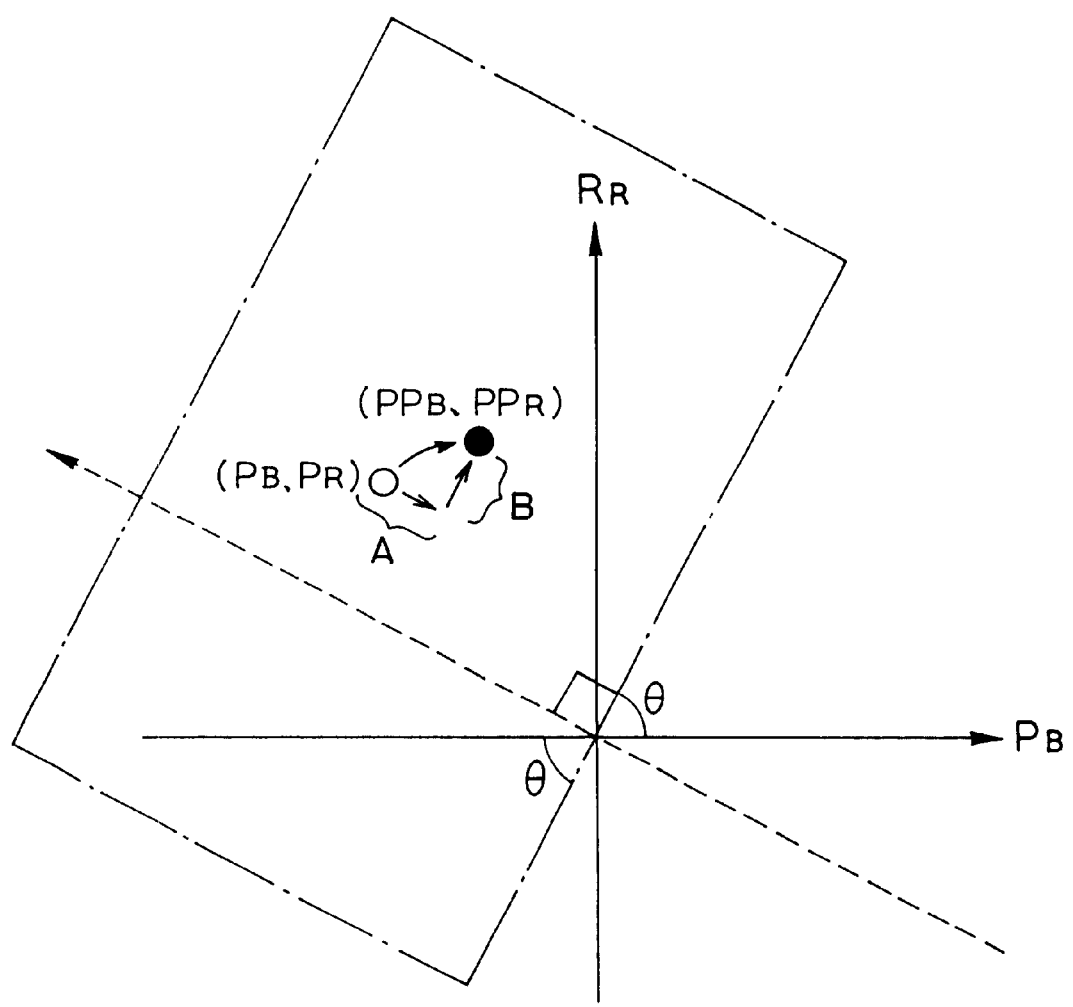
FIG. 11 is a diagram for explaining the hue adjusting operation by the color adjusting circuit shown in FIG. 9.

That is, as shown in FIG. 11, only the color component (color difference signals $P_B$ and $P_R$) belonging to the color region (region in the one-dot chain line) shown by the color designation signal CS becomes the target of the hue adjustment and those become the color adjustment dolor difference signals $(PP_B$ and $PP_R)$ whose hues have been adjusted in accordance with the color adjustment signals A and B and generated.

It is sufficient to fix the color adjustment signal B to "1" in order to perform only the saturation adjustment in the color adjusting circuit shown in FIG. 9. In brief, by setting the color adjustment signals A and B to proper values, the color adjustment such as saturation adjustment, hue adjustment, or the like can be performed to the original color difference signals.

According to the color adjusting circuit according to the invention as described above in detail, since the color adjustment such as saturation, hue, or the like can be performed only to the color component designated by the color designation signal among a plurality of color components in the display image, the color display can be easily adjusted to a desired color display state.

A video signal processing circuit for making adjustments of a brightness, a contrast, a hue, and the like of a color video signal by a simple circuit construction. Input video signals which are supplied as 3-primary color signals or luminance and color difference signals are converted to the luminance and color difference signals or the 3-primary color signals and processed to effect adjustments of a picture displaying form, and the adjusted signals are inversely converted subsequently. Values of matrix coefficients in matrix arithmetic operations for performing the converting and inversion converting processes can be freely adjusted. A color adjusting circuit of a color video signal which can make a color adjustment only to a desired color component in a display image. Color difference signals are subjected to a rotary coordinate transformation by a color designation angle according to a color designation signal, thereby obtaining rotated color difference signals. Whether the color difference signals exist in a color region shown by the color designation signal in color coordinates or not is discriminated. The level adjustment according to the color adjustment signal is performed only to the rotated color difference signals based on the color difference signals which were determined to be existing in the color region. The level adjusted signals are rotated in the direction opposite to that in the rotary coordinate transformation by a color designation angle, and obtained signals are outputted as color adjustment color difference signals.

What is claimed is:

1. A video signal processing circuit comprising:
   first matrix arithmetic operating means for performing a first matrix arithmetic operation based on a first coefficient group to 3-primary color signals R, G, and B or a luminance signal Y and two color difference signals PR and PB as input video signals and outputting the luminance signal Y and two color difference signals PR and PB or the 3-primary color signals R, G, and B;
   signal processing means for performing a signal process to an output signal of said first matrix arithmetic operating means and adjusting a picture display form;
   second matrix arithmetic operating means for performing a second matrix arithmetic operation based on a second coefficient group to signals output from the signal processing means and outputting the 3-primary color signals R, G, and B or the luminance signal Y and two color difference signals PR and PB; and
   coefficient adjusting means for adjusting values of said first and/or second coefficient groups.

2. A circuit according to claim 1, wherein said coefficient adjusting means adjusts the values of said first and/or second coefficient groups and simultaneously executes a conversion between said 3-primary color signals R, G, and B and said luminance signal Y and two color difference signals PR and PB and an adjustment of at least one of a contrast, a brightness, a color, a hue, and a white balance to said input video signals.

3. A circuit according to claim 1, wherein said coefficient adjusting means adjusts values of said first coefficient group and simultaneously performs a conversion from said 3-primary color signals R, G, and B to said luminance signal Y and two color difference signals PR and PB and an operation for rotating color difference coordinates axes for said two color difference signals PR and PB by a predetermined angle,
   said signal processing means adjusts hues to said two color difference signals PR and PB, and
   said coefficient adjusting means adjusts values of said second coefficient group and simultaneously performs a conversion from said luminance signal Y and two hue-adjusted color difference signals PR and PB to said 3-primary color signals R, G, and B and an operation for rotating color difference coordinates axes for said two color difference signals PR and PB in an opposite direction by a predetermined angle.

4. A color adjusting circuit of a color video signal for obtaining color adjustment color difference signals by performing a color adjusting process according to a color adjustment signal to color difference signals in the color video signal, comprising:

a first coordinates transforming circuit for performing a rotary coordinate transformation to said color difference signals in a first direction by an amount corresponding to a color designation angle according to a color designation signal, thereby obtaining rotated color difference signals;

a region discriminating circuit for discriminating whether or not said color difference signals exist in a color region represented by said color designation signal in color coordinates;

a level adjusting circuit for performing a level adjustment according to said color adjustment signal only to said rotated color difference signals obtained on the basis of said color difference signals which were determined to be existing in said color region; and a second coordinates transforming circuit for performing a rotary coordinate transformation to said rotated color difference signals subjected to the level adjustment by said level adjusting circuit by the amount corresponding to said color designation angle in the direction opposite to the first direction and outputting a resultant signal as said color adjustment color difference signals.

5. A circuit according to claim 4, wherein said color adjusting process is a saturation adjustment and/or a hue adjustment.

* * * * *